United States Patent
Seyffer et al.

(10) Patent No.: US 9,328,247 B2
(45) Date of Patent: May 3, 2016

(54) PAPER COATING SLIP ADDITIVE COMPRISING ACID MONOMER, ASSOCIATIVE MONOMER AND NONIONIC MONOMER

(71) Applicant: BASF SE, Ludwigshafen (DE)

(72) Inventors: Hermann Seyffer, Heidelberg (DE); Carmen-Elena Cimpeanu, Ludwigshafen (DE); Anja Song, Mannheim (DE); Thomas Steinmacher, Obersulm (DE); Joerg Claussen, Altrip (DE); Philipp Zacharias, Leeds (GB); Vijay Immanuel Raman, Mannheim (DE); Petra Schoecker, Buerstadt (DE)

(73) Assignee: BASF SE, Ludwigshafen (DE)

( * ) Notice: Subject to any disclaimer, the term of this patent is extended or adjusted under 35 U.S.C. 154(b) by 70 days.

(21) Appl. No.: 14/356,530

(22) PCT Filed: Nov. 7, 2012

(86) PCT No.: PCT/EP2012/071975
§ 371 (c)(1),
(2) Date: May 6, 2014

(87) PCT Pub. No.: WO2013/068375
PCT Pub. Date: May 16, 2013

(65) Prior Publication Data
US 2014/0302335 A1    Oct. 9, 2014

Related U.S. Application Data

(60) Provisional application No. 61/557,936, filed on Nov. 10, 2011.

(30) Foreign Application Priority Data

Nov. 10, 2011    (EP) .................................... 11188542

(51) Int. Cl.
*C09D 7/12*    (2006.01)
*C09D 4/06*    (2006.01)
*C08F 20/28*    (2006.01)

(52) U.S. Cl.
CPC .............. *C09D 7/1216* (2013.01); *C08F 20/28* (2013.01); *C09D 4/06* (2013.01); *Y10T 428/31906* (2015.04)

(58) Field of Classification Search
CPC .... C08F 220/06; C08F 220/18; C08F 220/26; C08F 20/28; C09D 7/1216; C09D 4/06; Y10T 428/319
USPC ........ 526/317.1, 318, 319, 328, 328.5, 329.6; 8/637.1, 115.6, 552, 557, 558, 618, 8/625, 626, 629, 919; 428/536
See application file for complete search history.

(56) References Cited

U.S. PATENT DOCUMENTS

| | | | |
|---|---|---|---|
| 5,770,760 A | * | 6/1998 | Robinson ....................... 560/221 |
| 7,288,616 B2 | * | 10/2007 | Tamareselvy et al. ........ 526/333 |
| 8,604,101 B2 | | 12/2013 | Ren et al. |
| 8,637,160 B2 | | 1/2014 | Schmidt-Thuemmes et al. |
| 8,771,812 B2 | | 7/2014 | Seyffer et al. |
| 2011/0189487 A1 | | 8/2011 | Zacharias et al. |
| 2012/0048463 A1 | | 3/2012 | Cimpeanu et al. |
| 2012/0058332 A1 | | 3/2012 | Müller et al. |
| 2012/0208344 A1 | | 8/2012 | Lauter et al. |
| 2012/0231627 A1 | | 9/2012 | Raman et al. |
| 2012/0235081 A1 | | 9/2012 | Raman et al. |
| 2012/0244350 A1 | | 9/2012 | Cimpeanu et al. |
| 2012/0308749 A1 | | 12/2012 | Seyffer et al. |
| 2012/0322264 A1 | | 12/2012 | Raman et al. |
| 2013/0101865 A1 | | 4/2013 | Ren et al. |
| 2013/0245168 A1 | | 9/2013 | Song et al. |
| 2013/0273739 A1 | | 10/2013 | Raman et al. |
| 2014/0011359 A1 | | 1/2014 | Klipp et al. |

FOREIGN PATENT DOCUMENTS

| | | |
|---|---|---|
| EP | 0 705 854 B2 | 4/1996 |
| WO | WO 2004/076743 A2 | 9/2004 |
| WO | WO 2011/058503 A1 | 5/2011 |
| WO | WO 2011/064734 A1 | 6/2011 |

(Continued)

OTHER PUBLICATIONS

U.S. Appl. No. 14/375,937, filed Jul. 31, 2014, Al-Hellani, et al.
International Search Report issued Jan. 23, 2013, in PCT/EP2012/071975 filed Nov. 7, 2012.
Yang-Bae Kim, "Dual-Curable Acrylic Pressure-Sensitive Adhesives Based on UV and Thermal Processes", Macromolecular Research, vol. 16, No. 2, XP-002690142, 2008, pp. 128-133.
C. Remzi Becer, et al., "Libraries of Methacrylic Acid and Oligo(ethylene glycol) Methacrylate Copolymers with LCST Behavior", Journal of Polymer Science, Part A: Polymer Chemistry, vol. 46 (21), XP-002690143, 2008, pp. 7138-7147.
U.S. Appl. No. 14/362,510, Jun. 3, 2014, Raman, et al.
U.S. Appl. No. 14/350,467, filed Apr. 8, 2014, Cimpeanu, et al.
U.S. Appl. No. 14/360,803, filed May 27, 2014, Seyffer, et al.

*Primary Examiner* — Leszek Kiliman
(74) *Attorney, Agent, or Firm* — Oblon, McClelland, Maier & Neustadt, L.L.P.

(57) ABSTRACT

A paper coating slip additive obtainable by free-radical polymerization, its preparation and its use in paper coating compositions are described. The additive is formed from (a) acid monomers selected from ethylenically unsaturated C3 to C8 carboxylic acids, (b) associative monomers of the general formula $H_2C=CR^1-COO-(EO)_n-(PO)_m-R^2$ where $R^1$ is hydrogen or methyl, n is at least two, m is from zero to 50, EO is an ethylene oxide group, PO is a propylene oxide group and $R^2$ is a C8-C30 alkyl group or a C8-C30 alkaryl group, and (c) nonionic copolymerizable monomers other than a) and b), wherein said additive has a weight average molecular weight of below 200 000 and wherein tert-dodecyl mercaptan is used as chain transfer agent.

20 Claims, No Drawings

(56) References Cited

FOREIGN PATENT DOCUMENTS

| WO | WO 2011/064735 A1 | 6/2011 |
| WO | WO 2011/069950 A1 | 6/2011 |
| WO | WO 2011/095444 A1 | 8/2011 |
| WO | WO 2011/104640 A1 | 9/2011 |
| WO | WO 2011/117308 A1 | 9/2011 |
| WO | WO 2011/157679 A1 | 12/2011 |
| WO | WO 2012/028520 A1 | 3/2012 |
| WO | WO 2012/028530 A1 | 3/2012 |
| WO | WO 2012/046179 A1 | 4/2012 |
| WO | WO 2012/069460 A1 | 5/2012 |
| WO | WO 2012/127336 A1 | 9/2012 |
| WO | WO 2012/163749 A2 | 12/2012 |
| WO | WO 2012/163821 A1 | 12/2012 |
| WO | WO 2013/041649 A1 | 3/2013 |
| WO | WO 2013/053840 A2 | 4/2013 |
| WO | WO 2013/083504 A1 | 6/2013 |
| WO | WO 2013/093557 A1 | 6/2013 |
| WO | WO 2013/120790 A1 | 8/2013 |

* cited by examiner

PAPER COATING SLIP ADDITIVE COMPRISING ACID MONOMER, ASSOCIATIVE MONOMER AND NONIONIC MONOMER

The present invention relates to a paper coating slip additive obtainable by free-radical polymerization, its preparation and its use in paper coating compositions. The additive is formed from (a) certain acid monomers, (b) certain associative monomers and (c) nonionic copolymerizable monomers other than (a) and (b), and has a relatively low weight average molecular weight due to the use of tert-dodecyl mercaptan as chain transfer agent.

Paper and board printability and visual appearance are frequently sought to be improved by surface coating the paper and board respectively with paper coating compositions. Paper coating compositions in addition to water generally comprise pigments, binders and auxiliaries for establishing the requisite rheological properties, thickeners for example. Paper coating compositions endow uncoated paper with the desired mechanical and optical properties. The binder is there to fix the pigments to the paper and ensure coherency in the coating obtained. Papers coated with paper coating compositions shall be efficiently printable in particular. Paper coating compositions can be applied to a moving web of paper via suitable rolls, in which case excess coating composition can be bladed off and recirculated to the stock reservoir vessel for the coating composition. The rheology of the aqueous paper coating composition must be right if processing is to be simple and proceed without issues. Viscosity should be very high at application, which is a low-shear step, and very low at the high-shear operation of blading off. Moreover, in the challenging process environment of continuous application with recirculation of bladed-off material, the rheology should remain constant for as long as possible. The absorptive effect of the paper continually removes water from the coating composition and this may lead to undesired increases in viscosity. Coating compositions are therefore desired that possess very good water retention. Owing to high cost pressures, paper producers try to run their plants as fast as possible in order to achieve a high output per unit time. At the same time, a high solids content is advantageous for overall costs, since less water has to be dried. Both measures impose tighter requirements on the performance profile of a coating slip, particularly in respect of rheology.

Coating slips having a high solids content inherently have a high viscosity. To adjust them to the desired target viscosity with a polymeric thickener needs only very low amounts thereof to be added. As a result, there is too little polymer in the coating slip capable of binding water. As a result, the coating slip is drained of water on application to paper so quickly that a firm filter cake forms on the surface, develops a pressure under the blade and leads to stripy coating. Coating slips having a high solids content therefore need an additive that thickens only minimally, if at all, but is highly binding of water in the coating slip in order that excessively rapid absorption in paper may be retarded. Water retention can be adversely affected by interaction with the other constituents of a paper composition. Complex factors are concerned here, the effects of which are difficult to foresee. The use of associative thickeners for establishing the rheological properties of paper coating compositions is known from WO 2004/076743, WO 2011/095444 and the references cited therein. The thickening effect of the thickeners described therein is excessive for the aforementioned purposes.

The problem addressed by the present invention was that of providing additives for uses in paper coating compositions having good rheological performance characteristics, a very low increase in viscosity and a very good water retention.

The present invention provides a paper coating slip additive formed by free-radical polymerization of a) at least one acid monomer selected from ethylenically unsaturated C3 to C8 carboxylic acids;

b) at least one associative monomer of the general formula $$H_2C=CR^1-COO-(EO)_n-(PO)_m-R^2$$

where $R^1$ is hydrogen or methyl, n is at least two, m is from zero to 50, EO is an ethylene oxide group, PO is a propylene oxide group and $R^2$ is a C8-C30 alkyl group or a C8-C30 alkaryl group, c) nonionic copolymerizable monomers other than a) and b);

wherein said additive has a weight average molecular weight of below 200 000 and preferably not more than 150 000, wherein tert-dodecyl mercaptan is used as chain transfer agent.

Associative monomers are monomers useful for preparing hydrophilic, water-soluble or water-swellable polymers having hydrophobic end or side groups. The hydrophobic end or side groups are water-insoluble. The structure of such polymers is similar to that of surface-active substances. The interaction between hydrophobic end or side groups results in a high viscosity at low shear.

The amount of acid monomers a) is preferably at least 25 wt %, for example from 25 to 55 or from 30 to 55 wt % or from 35 to 50 wt %, more preferably in the case of methacrylic acid at least 40 wt %, for example 40 to 55 wt %, based on the total of all monomers. The acid monomers are ethylenically unsaturated C3 to C8 carboxylic acids, especially free-radically polymerizable, alpha,beta-ethylenically unsaturated C3 to C8 carboxylic acids. Preferred acid monomers have the general formula $$RCH=CR'COOH$$

where R is H, $CH_3$ or COOX, and R' is H, C1-C4 alkyl or $CH_2COOX$ when R is H, or is H when R is $CH_3$, or is H or $CH_2COOX$ when R is COOX, where X is H or C1-C4 alkyl.

Acid monomers include, for example, acrylic acid, methacrylic acid, itaconic acid, fumaric acid, crotonic acid, actonitic acid and maleic acid and also in the case of polycarboxylic acids, their corresponding monoesters or partial esters. Acid monomers can be used individually or in mixtures. Acrylic acid, methacrylic acid and their mixture are particularly preferred.

The amount of associative monomers b) is preferably from 0.1 to 10 wt % and more preferably not more than 5 wt % or not more than 2 wt %, for example from 0.1 to 5 wt %, from 0.2 to 5 wt %, from 0.5 to 5 wt % or from 0.2 to 2%, based on the total of all monomers. Associative monomers are free-radically polymerizable surface-active chemicals which have both hydrophilic and hydrophobic groups. Hydrophobic groups include for example C8-C30 alkyl groups or C8-C30 alkaryl groups. Hydrophilic groups include for example polyethylene oxide groups having two or more ethylene oxide units. Associative monomers have the general formula $$H_2C=CR^1-COO-(EO)_n-(PO)_m-R^2$$

where $R^1$ is hydrogen or methyl, n is at least two, preferably from 6 to 100 or from 10 to 40, m is from zero to 50 and preferably from zero to 20, EO is an ethylene oxide group ($-CH_2-CH_2-O-$), PO is a propylene oxide group ($-CH_2-CH(CH_3)-O-$) and $R^2$ is a C8-C30 alkyl group or a C8-C30 alkaryl group, where n is preferably not less than m and n+m is preferably from 6 to 100 or from 10 to 40.

Associative monomers b) are for example those of formulae (III) to (VI) of EP 0011806. Suitable are for example surface-active alkylphenoxypoly(ethyleneoxy)ethyl(meth)acrylate esters of the formula $$Ar-O-(EO)_n-CO-CR=CH_2$$

where Ar is C8-C16-alkyl-substituted phenyl, R is H or CH$_3$, EO is an ethylene oxide group —C$_2$H$_4$O— and n is from 6 to 100 and preferably from 10 to 40.

Also suitable are for example alkoxypoly(ethyleneoxy)ethyl(meth)acrylate esters of the formula $$R'''-O-(EO)_n-CO-CR=CH_2$$

where R''' is a C8-C20-alkyl group, R is H or CH$_3$, EO is an ethylene oxide group —C$_2$H$_4$O— and n is from 6 to 50 and preferably from 10 to 40.

Also suitable are for example alkoxypoly(alkyleneoxy)ethyl(meth)acrylate esters of the formula $$R'''-O-(PO)_m-(EO)_n-C_2H_4O-CO-CR=CH_2$$

where R''' is a C8-C20-alkyl group, R is H or CH$_3$, EO is an ethylene oxide group —C$_2$H$_4$O—, PO is a propylene oxide group —CH$_2$—CH(CH$_3$)—O—, n is from 6 to 50 and preferably from 10 to 40 and m is from 1 to 40.

Particularly preferred monomers b) have the general formula $$H_2C=CR^1-COO-(EO)_n-R^2$$

where R$^1$ is hydrogen or methyl, n is from 10 to 40 and R$^2$ is a C10 to C30 alkyl group. A methacrylic ester of a C16-C18 fatty alcohol mixture ethoxylated with about 25 mol of ethylene oxide and obtainable under the designation PLEX® 6954-O is suitable for example.

The amount of copolymerizable nonionic monomers c) is preferably from 20 to 70 wt %, or from 25 to 65 wt % or from 25 to 60 wt % or from 30 to 58 wt %, based on the total of all monomers. Nonionic monomers c) can be those of the general formula $$CH_2=CYZ$$

where Y is H, CH$_3$ or chlorine; Z is COOR, CON H$_2$, CONHR, CONR$_2$, C$_6$H$_4$R', CN, Cl, —OCOR'' or CH=CH$_2$; R is C1-C8 alkyl or C2-C8 hydroxyalkyl; R' is H, Cl, Br or C1-C4; and R'' is C1-C8 alkyl. Preferred nonionic monomers are those wherein when Y is H, then Z is COOR, CONH$_2$, CONHR, CONR$_2$, C$_6$H$_4$R', CN, Cl, —OCOR'' or CH=CH$_2$; or when Y is CH$_3$, then Z is COOR, CONH$_2$, CONHR, CONR$_2$, C$_6$H$_4$R', CN, or CH=CH$_2$; or when Y is Cl, then Z is Cl.

Nonionic monomers c) can be more particularly selected from C1-C20-alkyl(meth)acrylates, vinyl esters of carboxylic acids comprising up to 20 carbon atoms, vinylaromatics having up to 20 carbon atoms, vinyl halides, aliphatic hydrocarbons having 2 to 8 carbon atoms and one or two double bonds, monomers comprising ether groups, especially vinyl ethers of alcohols comprising 1 to 10 carbon atoms and monomers having at least one nitrogen atom in the molecule, or mixtures thereof. Nitrogen monomers include for example vinylcarboxamides, (meth)acrylamide, N-vinylformamide, N-vinylacetamide, N-methyl-N-vinylformamide, N-methyl-N-vinylacetamide, N-vinylpyrrolidone, N-vinylcaprolactam, vinylimidazole. Typical nonionic monomers c) include for example C1-C8 alkyl esters and C2-C8 hydroxyalkyl esters of acrylic acid or of methacrylic acid, examples being ethyl acrylate, ethyl methacrylate, methyl methacrylate, 2-ethylhexyl acrylate, butyl acrylate, butyl methacrylate, 2-hydroxyethylacrylate, 2-hydroxybutyl methacrylate; styrene, vinyltoluene, t-butylstyrene, isopropylstyrene, p-chloro-styrene; vinyl acetate, vinyl butyrate, vinyl caprolate; acrylonitrile, methacrylonitrile, butadiene, isoprene, vinyl chloride, vinylidene chloride, and the like. Preferred nonionic monomers c) are selected from the group consisting of acrylic esters of monohydric alcohols having 1 to 20 carbon atoms and methacrylic esters of monohydric alcohols having 1 to 20 carbon atoms.

To obtain the desired low molecular weight, chain transfer agents are used to prepare the additives of the present invention. tert-Dodecyl mercaptan is at least one of the chain transfer agents. It is used in such amounts that the weight average molecular weight M$_w$ of the additives is less than 200 000 and preferably less than 150 000. Typical use levels range for example from 0.15 to 2 parts by weight or from 0.3 to 1 part by weight, based on 100 parts by weight of the monomers to be polymerized. Other chain transfer agents can optionally be used in addition, examples being compounds having a thiol group such as tert-butyl mercaptan, ethyl acryloyl thioglycolate, mercaptoethanol, mercaptopropyltrimethoxysilane. It is optionally further possible to use chain transfer agents without a thiol group, for example terpinolene. In one preferred embodiment, the additive has been prepared without use of additional chain transfer agents.

In one preferred embodiment, the additive of the present invention is formed by free-radical polymerization of a) 25 to 55 wt % of at least one acid monomer selected from acrylic acid, methacrylic acid and their mixture;

b) 0.1 to 5 wt % of at least one associative monomer of the general formula $$H_2C=CR^1-COO-(EO)_n-R^2$$

where R$^1$ is hydrogen or methyl, n is from 10 to 40 and R$^2$ is a C10 to C30 alkyl group, c) 20 to 70 wt % of nonionic copolymerizable monomers other than a) and b) and selected from those of the general formula $$CH_2=CYZ$$

where Y is H, CH$_3$ or chlorine; Z is COOR, CONH$_2$, CONHR, CONR$_2$, C$_6$H$_4$R', CN, Cl, —OCOR'' or CH=CH$_2$; R is C1-C8 alkyl or C2-C8 hydroxyalkyl; R' is H, Cl, Br or C1-C4; and R'' is C1-C8 alkyl, wherein tert-dodecyl mercaptan is used as chain transfer agent in an amount of 0.15 to 2 parts by weight per 100 parts by weight of monomers.

The additives of the present invention are obtainable by free-radical polymerization, in particular by emulsion polymerization. In the emulsion polymerization, as a rule ionic and/or nonionic emulsifiers and/or protective colloids or stabilizers are used as surface-active compounds in order to promote the dispersing of the monomers in the aqueous medium. The emulsifiers are preferably anionic or nonionic emulsifiers. Suitable emulsifiers are, for example, ethoxylated C$_8$- to C$_{36}$- or C$_{12}$- to C$_{18}$-fatty alcohols having a degree of ethoxylation of from 3 to 50 or from 4 to 30, ethoxylated mono-, di- and tri-C$_4$- to C$_{12}$- or C$_4$- to C$_9$-alkylphenols having a degree of ethoxylation of from 3 to 50, alkali metal salts of dialkyl esters of sulfosuccinic acid, alkali metal and ammonium salts of C$_8$- to C$_{12}$-alkylsulfates, alkali metal and ammonium salts of C$_{12}$- to C$_{18}$-alkylsulfonic acids and alkali metal and ammonium salts of C$_9$- to C$_{18}$-alkylarylsulfonic acids. Cationic emulsifiers are, for example, compounds having at least one amino or ammonium group and at least one $C_8$-$C_{22}$-alkyl group. Further suitable emulsifiers are compounds of the general formula

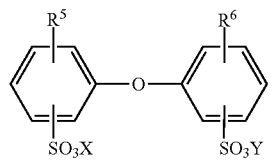

in which $R^5$ and $R^6$ are hydrogen or $C_4$- to $C_{14}$-alkyl and are not simultaneously hydrogen, and X and Y may be alkali metal ions and/or ammonium ions. Preferably, $R^5$, $R^6$ are linear or branched alkyl radicals having 6 to 18 carbon atoms or hydrogen and in particular having 6, 12 and 16 carbon atoms, $R^5$ and $R^6$ not both simultaneously being hydrogen. X and Y are preferably sodium, potassium or ammonium ions, sodium being particularly preferred. Compounds II in which X and Y are sodium, $R^5$ is a branched alkyl radical having 12 carbon atoms and $R^6$ is hydrogen or $R^5$ are particularly advantageous. Industrial mixtures which have a proportion of from 50 to 90 wt % of the monoalkylated product, for example Dowfax®2A1 (trademark of Dow Chemical Company) are frequently used. Suitable emulsifiers are also described in Houben-Weyl, Methoden der organischen Chemie, Volume 14/1, Makromolekulare Stoffe, Georg Thieme Verlag, Stuttgart, 1961, pages 192 to 208. Trade names of emulsifiers are, for example, Dowfax®2 A1, Emulan® NP 50, Dextrol® OC 50, emulsifier 825, emulsifier 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. Copolymerizable emulsifiers which comprise an ethylenically unsaturated double bond capable of free-radical polymerization, for example reactive anionic emulsifiers, such as Adeka® Resoap SR-10, are also suitable.

The emulsion polymerization is effected as a rule at from 30 to 130, preferably from 50 to 90, ° C. The polymerization medium may consist only of water as well as of mixtures of water and liquids miscible therewith, such as methanol. Preferably, only water is used. The emulsion polymerization can be carried out both as a batch process and in the form of a feed process, including step or gradient procedure. The feed process in which a part of the polymerization batch is initially taken, heated to the polymerization temperature and prepolymerized and the remainder of the polymerization batch is then fed in continuously or stepwise, usually over a plurality of spatially separate feeds, one or more of which comprise the monomers in pure or in emulsified form is preferred.

In the emulsion polymerization, the customary and known assistants, such as, for example, water-soluble initiators and chain transfer agents, can be used. Initiators which form free-radicals under the reaction conditions are usually used in the emulsion polymerization. The amount of initiators is in general from 0.1 to 10 wt % or from 0.5 to 5 wt %, based on the monomers to be polymerized. The initiators are preferably used in amounts of up to 2 wt %, and preferably at least 0.9 wt %, for example from 1.0 to 1.5 wt %, based on the monomers to be polymerized. Suitable polymerization initiators are, for example, peroxides, hydroperoxides, hydrogen peroxide, sodium or potassium persulfate, redox catalysts and azo compounds, such as 2,2-azobis(4-methoxy-2,4-dimethylvaleronitrile), 2,2-azobis(2,4-dimethylvaleronitrile) and 2,2-azobis(2-amidinopropane)dihydrochloride. Examples of further suitable initiators are dibenzoyl peroxide, tert-butyl perpivalate, tert-butyl per-2-ethylhexanoate, di-tert-butyl peroxide, diamyl peroxide, dioctanoyl peroxide, didecanoyl peroxide, dilauroyl peroxide, bis(o-toluyl)peroxide, succinyl peroxide, tert-butyl peracetate, tert-butyl permaleate, tert-butyl perisobutyrate, tert-butyl perpivalate, tert-butyl peroctanoate, tert-butyl perbenzoate, tert-butyl hydroperoxide, azobisisobutyronitrile, 2,2'-azobis(2-methylbutyronitrile), 2,2'-azobis(2,4-dimethylvaleronitrile) and 2,2'-azobis(N,N'-dimethyleneisobutyroamidine)dihydrochloride. Initiators are preferably selected from the group consisting of the peroxodisulfates, peroxosulfates, azoinitiators, organic peroxides, organic hydroperoxides and hydrogen peroxide. So-called reduction-oxidation (redox) initiator systems are also suitable. The redox initiator systems consist of at least one generally inorganic reducing agent and an inorganic or organic oxidizing agent. The oxidizing component is, for example, the initiators already mentioned above for the emulsion polymerization. The reducing components are, for example, alkali metal salts of sulfurous acid, such as, for example, sodium sulfite, sodium hydrogen sulfite, alkali metal salts of disulfurous acid, such as sodium disulfite, bisulfite adducts of aliphatic aldehydes and ketones, such as acetone bisulfite, or reducing agents such as hydroxymethanesulfinic acid and salts thereof, or ascorbic acid. The redox initiator systems can be used with concomitant use of soluble metal compounds whose metallic component can occur in a plurality of valency states. Customary redox initiator systems are, for example, ascorbic acid/iron (II) sulfate/sodium peroxodisulfate, tert-butyl hydroperoxide/sodium disulfite, tert-butyl hydroperoxide/sodium hydroxymethanesulfinic acid or tert-butyl hydroperoxide/ascorbic acid. The individual components, for example the reducing component, may also be mixtures, for example a mixture of the sodium salt of hydroxymethanesulfinic acid and sodium disulfite. Said compounds are generally used in the form of aqueous solutions, the lower concentration being determined by the amount of water acceptable in the dispersion and the upper concentration by the solubility of the relevant compound in water. Water-soluble initiators, e.g. sodium persulfate, potassium persulfate, ammonium persulfate, sodium peroxodisulfate, potassium peroxodisulfate and/or ammonium peroxodisulfate, are particularly preferably used. The polymerization can also be initiated with the aid of high-energy beams, such as electron beams or by irradiation with UV light. A plurality of different initiators may also be used in the emulsion polymerization.

In one preferred embodiment of the additives according to the present invention, the as-formed reaction product from the actual polymerization is subjected to an aftertreatment and reacted with initiators that form nonionic free-radicals. The nonionic free-radicals are preferably hydroxyl free-radicals, formed for example from hydrogen peroxide or from organic hydroperoxides, or are alkoxy free-radicals as formed from organic alkyl peroxides for example. Examples of initiators for the aftertreatment include hydrogen peroxide, dibenzoyl peroxide, tert-butyl perpivalate, tert-butyl per-2-ethylhexanoate, di-tert-butyl peroxide, diamyl peroxide, dioctanoyl peroxide, didecanoyl peroxide, dilauroyl peroxide, bis(o-toluyl)peroxide, succinyl peroxide, tert-butyl peracetate, tert-butyl permaleate, tert-butyl perisobutyrate, tert-butyl perpivalate, tert-butyl peroctoate, tert-butyl perbenzoate, tert-butyl hydroperoxide. Preference is given to using peroxide compounds selected from hydrogen peroxide, organic peroxides and organic hydroperoxides.

It is particularly preferable if a redox initiator system is used for the aftertreatment, the oxidizing component used being at least one peroxide compound selected from hydrogen peroxide, organic peroxides and organic hydroperoxides and the reducing component used being an inorganic or organic reducing agent. The reducing components are, for example, alkali metal salts of sulfurous acid, such as, for example, sodium sulfite, sodium hydrogen sulfite, alkali salts of disulfurous acid, such as sodium disulfite, bisulfite adducts of aliphatic aldehydes and ketones, such as acetone bisulfite, or reducing agents such as hydroxymethanesulfinic acid and salts thereof, or ascorbic acid. The redox initiator systems for the aftertreatment can be used with concomitant use of soluble metal compounds whose metallic component may occur in a plurality of valency states. Redox initiator systems are, for example, ascorbic acid/iron(II) sulfate/sodium peroxodisulfate, tert-butyl hydroperoxide/sodium disulfite, tert-butyl hydroperoxide/sodium hydroxymethanesulfinic acid or tert-butyl hydroperoxide/ascorbic acid. The individual components, for example the reducing component, may also be mixtures, for example a mixture of the sodium salt of hydroxymethanesulfinic acid and sodium disulfite. Hydrogen peroxide/ascorbic acid and tert-butyl hydroperoxide/ascorbic acid are particularly preferred for the aftertreatment.

The amounts of initiator which are used for the aftertreatment are preferably from 0.001 to 0.1 part by weight, particularly preferably from 0.002 to 0.05 part by weight, based on 100 parts by weight of monomers.

The addition of the initiators for the aftertreatment is effected after the main polymerization of the monomers has taken place, i.e. after preferably more than 50 wt %, in particular at least 70 wt % or at least 90 wt % or particularly preferably 100 wt % of all monomers have been added and preferably more than 50 wt %, in particular at least 70 wt % or at least 90 wt % of all monomers have undergone polymerization.

The aftertreatment with initiators forming the nonionic free-radicals is preferably effected at temperatures of at least 60° C., particularly preferably of at least 70° C., for example at 60-130° C. or 70-90° C.

The present invention also provides a process for preparing the paper coating slip additive described above, which process comprises a monomer mixture of
a) at least one acid monomer selected from ethylenically unsaturated C3 to C8 carboxylic acids;
b) at least one associative monomer of the general formula

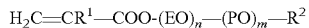

where $R^1$ is hydrogen or methyl, n is at least two, m is from zero to 50, EO is an ethylene oxide group, PO is a propylene oxide group and $R^2$ is a C8-C30 alkyl group or a C8-C30 alkaryl group, and
c) nonionic copolymerizable monomers other than a) and b); being free-radically polymerized and tert-dodecyl mercaptan being used as chain transfer agent in an amount such that the additive has a weight average molecular weight of below 200 000 and preferably not more than 150 000.

The paper coating additives of the present invention are used for producing paper coatings. The present invention accordingly also provides a paper coating composition comprising at least one paper coating slip additive of the present invention, inorganic pigments, at least one binder and water and also optionally further addition agents.

Paper coating compositions in addition to water generally comprise pigments, binders and assistants for establishing the required rheological properties, e.g. thickeners. The pigments are usually dispersed in water. The paper coating composition comprises pigments in an amount of, preferably, at least 80 wt %, e.g. from 80 to 95 wt % or from 80 to 90 wt %, based on the total solids content. White pigments are particularly suitable. Suitable pigments are, for example, metal salt pigments, such as, for example, calcium sulfate, calcium aluminate sulfate, barium sulfate, magnesium carbonate and calcium carbonate, of which carbonate pigments, in particular calcium carbonate, are preferred. The calcium carbonate may be natural ground calcium carbonate (GCC), precipitated calcium carbonate (PCC), lime or chalk. Suitable calcium carbonate pigments are available, for example, as Covercarb® 60, Hydrocarb® 60 or Hydrocarb® 90 ME. Further suitable pigments are, for example, silicas, aluminas, aluminum hydrate, silicates, titanium dioxide, zinc oxide, kaolin, alumina, talc or silicon dioxide. Suitable further pigments are available, for example, as Capim® MP 50 (clay), Hydragloss® 90 (clay) or Talcum 010.

The additives of the present invention are used in paper coating compositions of the present invention to establish the desired rheology and water retention. Use levels are preferably from 0.05 to 5 or from 0.1 to 2 parts by weight, based on 100 parts by weight of pigments.

The paper coating composition comprises at least one binder. The most important functions of binders in paper coating compositions are to bind the pigments to the paper and the pigments to one another and partly to fill cavities between pigment particles. For example, from 1 to 50 parts by weight, preferably from 1 to 25 parts by weight or from 5 to 20 parts by weight of an organic binder (solid, i.e. without water or other solvents liquid at 21° C., 1 bar) are used per 100 parts by weight of the pigments.

Suitable binders include natural binders, in particular starch-based binders, and synthetic binders, in particular emulsion polymers which can be prepared by emulsion polymerization. In this context, starch-based binders are to be understood as meaning any native, modified or degraded starch. Native starches may consist of amylose, amylopectin or mixtures thereof. Modified starches may be oxidized starch, starch esters or starch ethers. The molecular weight of the starch can be reduced by hydrolysis (degraded starch). Suitable degradation products are oligosaccharides or dextrins. Preferred starches are cereal, corn and potato starch. Cereal and corn starch are particularly preferred and cereal starch is very particularly preferred. In the case of the use of synthetic binders, natural binders, such as starch, can also be concomitantly used but are not absolutely essential.

The synthetic binders preferably comprise at least 40 wt %, preferably at least 60 wt %, particularly preferably at least 80 wt %, of so-called main monomers. The main monomers are selected from $C_1$-$C_{20}$-alkyl(meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds or mixtures of these monomers. For example, alkyl(meth)acrylates having a $C_1$-$C_{10}$-alkyl radical, such as methyl methacrylate, methyl acrylate, n-butyl acrylate, ethyl acrylate and 2-ethylhexyl acrylate, may be mentioned. In particular, mixtures of alkyl (meth)acrylates are also suitable. Vinyl esters of carboxylic acids having 1 to 20 carbon atoms are, for example, vinyl laurate, vinyl stearate, vinyl propionate, vinyl versatate and vinyl acetate. Suitable vinylaromatic compounds are vinyl toluene, α- and p-methylstyrene, α-butyl-styrene, 4-n-butyl-styrene, 4-n-decylstyrene and preferably styrene. Examples of nitriles are acrylonitrile and methacrylonitrile. The vinyl halides are ethylenically unsaturated compounds substituted by chlorine, fluorine or bromine, preferably vinyl chloride and vinylidene chloride. For example, vinyl methyl ether or vinyl isobutyl ether may be mentioned as vinyl ethers. Vinyl ethers of alcohols comprising 1 to 4 carbon atoms are preferred. Ethylene, propylene, butadiene, isoprene and chloroprene may be mentioned as hydrocarbons having 2 to 8 carbon atoms and one or two olefinic double bonds.

Preferred main monomers are $C_1$-$C_{10}$-alkyl(meth)acrylates and mixtures of alkyl(meth)acrylates with vinylaromatics, in particular styrene, or hydrocarbons having 2 double bonds, in particular butadiene, or mixtures of such hydrocarbons with vinylaromatics, in particular styrene. In the case of mixtures of aliphatic hydrocarbons (in particular butadiene) with vinylaromatics (in particular styrene), the ratio may be, for example, from 10:90 to 90:10, in particular from 20:80 to 80:20. Particularly preferred main monomers are butadiene and the abovementioned mixtures of butadiene and styrene.

In addition to the main monomers, the emulsion polymer suitable as a binder may comprise further monomers, for example monomers having carboxyl, sulfo or phosphonic acid groups. Carboxyl groups are preferred. For example, acrylic acid, methacrylic acid, itaconic acid, maleic acid or fumaric acid may be mentioned. The content of ethylenically unsaturated acids in the emulsion polymer is in general less than 10 wt %, preferably less than 8 wt % and at least 0.1 wt % or at least 1 wt %. Further monomers are also, for example, monomers comprising hydroxyl groups, in particular $C_1$-$C_{10}$-hydroxyalkyl(meth)acrylates, or amides such as (meth)acrylamide.

Paper coating compositions of the present invention may additionally comprise further addition and auxiliary agents, for example fillers, co-binders and thickeners for further optimizing viscosity and water retention, optical brighteners, dispersants, surfactants, lubricants (e.g. calcium stearate and waxes), neutralizing agents (e.g. NaOH or ammonium hydroxide) for pH adjustment, antifoams, deaerating agents, preservatives (e.g. biocides), leveling agents, dyes (in particular soluble dyes), etc. Suitable further thickeners in addition to synthetic polymers (e.g. crosslinked polyacrylate, associative thickeners) are in particular celluloses, preferably carboxymethylcellulose. Optical brighteners are, for example, fluorescent or phosphorescent dyes, in particular stilbenes.

Preferably an aqueous paper coating composition is concerned; it comprises water more particularly from the preparation form of the constituents (aqueous polymeric dispersions, aqueous pigment slurries); the desired viscosity can be established by adding further water. Customary solids contents of paper coating compositions range from 30 to 70 wt %. In one preferred embodiment, the solids content is above 65% and preferably not less than 68% or not less than 70%. The pH of the paper coating composition is preferably adjusted to values in the range from 6 to 10 and especially above 7, for example in the range from 7 to 9.5 or from 8 to 9.

A preferred embodiment of the invention provides a paper coating composition comprising (i) 0.05 to 2 parts by weight, based on 100 parts by weight of pigment, of at least one above-described additive according to the invention, (ii) 80 to 95 wt %, based on the total solids content, of pigments selected from calcium sulfate, calcium aluminate sulfate, barium sulfate, magnesium carbonate, calcium carbonate, silicas, aluminas, aluminum hydrate, silicates, titanium dioxide, zinc oxide, kaolin, argillaceous earth, talc and silicon dioxide, (iii) 1 to 25 parts by weight and preferably 5 to 15 or 8 to 10 parts by weight of at least one binder, and (iv) optionally at least one thickener.

The present invention also provides paper or board coated with a paper coating composition of the present invention and a process for coating paper or board wherein an additive according to the present invention is prepared or made available; and this additive, at least one pigment, at least one binder and optionally further auxiliary agents are used to prepare a paper coating composition; and the paper coating composition is applied to at least one surface of paper or board.

The paper coating composition is preferably applied to uncoated base papers or to uncoated board. The amount is in general from 1 to 50 g, preferably from 5 to 30 g (solid, i.e. without water or other solvents which are liquid at 21° C., 1 bar), per square meter. The coating can be effected by customary application methods, for example by means of a size press, film press, blade coater, air brush, knife coater, curtain coating method or spray coater. Depending on the pigment system, the additives according to the invention can be used in paper coating compositions for the basecoat and/or for the topcoat.

Paper coating compositions according to the invention have good performance characteristics, in particular good rheological properties and good water retention properties. The coated papers and boards can be readily printed on in the customary printing processes, such as relief printing, gravure printing, offset printing, digital printing, inkjet printing, flexographic printing, newspaper printing, letterpress printing, sublimation printing, laser printing, electrophotographic printing or a combination of these printing processes.

EXAMPLES

Unless otherwise evident from the context, the data in percent are always percent by weight. The content data relate to the content in aqueous solution or dispersion.

Examples 1-4

Preparation of Polymer Dispersions D1 to D4

A reactor is purged with nitrogen and then initially charged with 465.0 g of demineralized water and 6.0 g of Disponil SDS emulsifier (15% strength). The mixture in the initial charge is heated to 86° C. Then, 4.3 g of sodium peroxodisulfate (7% strength) are added, which is followed by stirring for 5 minutes. The emulsion feed consisting of 300.0 g of demineralized water, 22.0 g of Disponil SDS 15 (15% strength) emulsifier, 300.0 g of monomer mixture (methacrylic acid, associative monomer and ethyl acrylate as per table 1) and 1.65 g of chain transfer agent (as per table 1) are metered into the reactor during 2 hours. Concurrently with the emulsion feed, the initiator feed is started (6.8 g of sodium peroxodisulfate (7% strength)) and likewise continued for 2 hours. After the emulsion feed has ended, the mixture is secondarily polymerized for 30 min. The reactor is then cooled down to 70° C. and 6.0 g of hydrogen peroxide (5% strength) are added over 15 min. This is followed by cooling to room temperature. The solids content of the dispersions obtained is about 27%.

Example 5

Preparation of Polymer Dispersion D5

A reactor is purged with nitrogen and then initially charged with 300.0 g of demineralized water and 13.3 g of Disponil FES 993 emulsifier (30% strength). The mixture in the initial charge is heated to 86° C. Then, 4.0 g of sodium peroxodisulfate (7% strength) are added, which is followed by stirring for 5 minutes. The emulsion feed consisting of 250.0 g of demineralized water, 40.0 g of Disponil FES 993 (30% strength) emulsifier, 400.0 g of monomer mixture (methacrylic acid, associative monomer and ethyl acrylate as per table 1) and 1.8 g of chain transfer agent (as per table 1) are metered into the reactor over the course of 2 hours. Concurrently with the emulsion feed, the initiator feed is started (7.7 g of sodium peroxodisulfate (7% strength) and 16 g demineralized water) and continued for 3 hours. After the initiator feed has ended, the mixture is secondarily polymerized for 30 min. Then 22.4 g of Dowfax 2A1 emulsifier are added, which is followed by cooling to room temperature. The solids content of the dispersions obtained is about 27%.

Associative Monomers Used:
Plex 6954-O=mixture of 80% steareth-25 ethoxylate methacrylate and 20% methacrylic acid
DPX 3472=steareth-10 ethoxylate allyl ether
Chain Transfer Agents Used:
t-DMK=tert-dodecyl mercaptan
n-DMK=n-dodecyl mercaptan

TABLE 1

Copolymer composition

| Example | Monomers | Chain transfer agent | Molecular weight Mw |
|---|---|---|---|
| D1 | 9.4 g Plex 6954-O<br>133.5 g methacrylic acid<br>157.1 g ethyl acrylate | t-DMK | about 90 000 |
| D2 | 9.4 g Plex 6954-O<br>133.5 g methacrylic acid<br>157.1 g ethyl acrylate | n-DMK | about 100 000 |
| D3 | 7.5 g DPX 3472<br>135.4 g methacrylic acid<br>157.1 g ethyl acrylate | t-DMK | about 100 000 |
| D4 | 7.5 g DPX 3472<br>135.4 g methacrylic acid<br>157.1 g ethyl acrylate | n-DMK | about 100 000 |
| D5 | 12.0 g Plex 6954-O<br>158.0 g methacrylic acid<br>230.0 g ethyl acrylate | t-DMK | about 150 000 |

The aqueous additive compositions of examples 1-5 are used to prepared paper coating slips.

Offset Basecoat Recipe:

The initial charge comprises 100 parts of a slurry of coarsely divided calcium carbonate (reckoned as solid CaCO3; solids contents of slurry about 77.7%, (Hydrocarb 60). Based on the dry pigment, 10% of binder are used (reckoned dry; styrene-butadiene binder Styronal® D 628 with solids content about 50%). The solids content is adjusted with water to values of somewhat above 65% or 70%. Then, sufficient rheology additive is added to obtain the target viscosity (Brookfield, 100 rpm) of about 1400 mPas. Finally, sufficient water is added for the resulting solids content of the coating slip to be exactly 65% or 70%.

Water retention and immobilization time are measured for each paper coating slip. The results are summarized in table 2. The Water Retention According to Gradek is Measured as Follows:

The water retention (WR) was measured by the GRADEK method. The method characterizes a coating slip with respect to its water retention in a standardized laboratory test. Good water retention is very important for the processing of a paper coating composition on large and high-speed paper coating plants. The coating slip to be tested is dewatered under defined conditions (pressure 1 bar, measuring time 1 minute) over a polycarbonate membrane in a filter paper layer. The amount of water taken up by the filter paper layer is determined gravimetrically. The greater the amount of water which has been taken up, the poorer is the water retention of the paper coating composition. The amount of water taken up is stated in $g/m^2$. Since deviations in the results of the measurement may occur with the use of different batches of the membrane filters, a comparison of different coating slips is carried out in each case using membrane filters of the same batch.

Devices and Materials Used:
Abo Akademi Gravimetric Water Retention pressure filtration device,
balance, with which it is possible to measure with an accuracy of 0.1 mg,
polycarbonate membrane filter, from Piper, pore size 5 μm, diameter 47 mm,
Schwarzband filter paper, Schleicher & Schüll, diameter 9 cm, stopwatch Immobilization Time is Measured as Follows:

Immobilization time is the time in seconds for a coating slip to become immobile on a paper, i.e. for a firm filter cake to form. The test method characterizes the water retention of a paper coating slip under defined shear and drainage conditions. A sample of the coating slip is drained through two papers under a rotating spindle using a vacuum. The coating slip is situated in a rotary viscometer, on a sieve with paper underneath. A vacuum is applied from below. The spindle is at a defined distance from the paper (100 μm in general) and is moved at a constant shear stress (300 Pa in general). As soon as the coating slip drains, the viscosity rises abruptly. Once the viscosity of the coating slip has risen so much as a result of drainage that the spindle turns at less than 0.05 rpm at the given shear stress, the so-called immobilization point has been reached. The time from the start of drainage to the immobilization point is measured. The longer the immobilization time the better.

TABLE 2

Water retention and immobilization time of paper coating slips

| Example | Additive | Chain transfer agent | Associative monomer | Water retention [g/m$^{-2}$] | Immobilization time |
|---|---|---|---|---|---|
| 1 | D1 | t-DMK | Plex 6954-O | 46 | 760 |
| 2 | D2 | n-DMK | Plex 6954-O | 51 | 680 |
| 3 | D3 | t-DMK | DPX 3472 | 52 | 660 |
| 4 | D4 | n-DMK | DPX 3472 | 49 | 720 |
| 5 | D5 | t-DMK | Plex 6954-O | 48 | 740 |

Examples 1 and 5 according to the present invention display the best water retention and immobilization time values.

We claim:

1. A paper coating slip additive formed by a process comprising performing free-radical polymerization of
   a) an acid monomer selected from ethylenically unsaturated C3 to C8 carboxylic acids;
   b) an associative monomer of formula

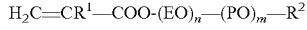

$H_2C\!\!=\!\!CR^1\!\!-\!\!COO\text{-}(EO)_n\!\!-\!\!(PO)_m\!\!-\!\!R^2$ wherein $R^1$ is hydrogen or methyl, n is at least two, m is from zero to 50, EO is an ethylene oxide group, PO is a propylene oxide group and $R^2$ is a C8-C30 alkyl group or a C8-C30 alkaryl group; and
   c) a nonionic copolymerizable monomer other than a) and b);
   wherein the additive has a weight average molecular weight of below 200,000,
in the presence of tert-dodecyl mercaptan as a chain transfer agent.

2. The additive according claim 1, wherein an amount of acid monomer a) is at least 25 wt % and preferably 30 to 55 wt % based on a total weight of all monomers.

3. The additive according to claim 1, wherein an amount of associative monomer b) is from 0.1 to 10 wt % based on a total weight of all monomers.

4. The additive according to claim 1, wherein an amount of copolymerizable monomer c) is from 20 to 70 wt % based on a total weight of all monomers.

5. The additive according to claim 1, wherein the acid monomer is at least one selected from the group consisting of acrylic acid and methacrylic acid.

6. The additive according to claim 1, wherein the associative monomer is of formula $$H_2C=CR^1-COO-(EO)_n-R^2$$

wherein $R^1$ is hydrogen or methyl, n is from 10 to 40 and $R^2$ is a C10 to C30 alkyl group.

7. The additive according to claim 1, wherein the nonionic copolymerizable monomer c) is of formula $$CH_2=CYZ$$

wherein Y is H, $CH_3$ or chlorine; Z is COOR, $CONH_2$, CONHR, $CONR_2$, $C_6H_4R'$, CN, Cl, OCOR" or $CH=CH_2$; R is C1-C8 alkyl or C2-C8 hydroxyalkyl; R' is H, Cl, Br or C1-C4; and R" is C1-C8 alkyl.

8. The additive according to claim 7, wherein the polymerization obtains a reaction product which is reacted after the polymerization with initiators that form nonionic free-radicals.

9. The additive according to claim 8, wherein a temperature at which the reaction product was reacted with initiators that form nonionic free-radicals after the polymerization is at least 60° C.

10. The additive according to claim 1, wherein the chain transfer agent tert-dodecyl mercaptan is employed in an amount of from 0.15 to 2 parts by weight per 100 parts by weight of monomers.

11. The additive according to claim 1, which is formed by free-radical polymerization of
 a) 25 to 55 wt % of at least one acid monomer selected from the group consisting of acrylic acid and methacrylic acid;
 b) 0.1 to 5 wt % of an associative monomer of formula $$H_2C=CR^1-COO-(EO)_n-R^2$$

wherein $R^1$ is hydrogen or methyl, n is from 10 to 40 and $R^2$ is a C10 to C30 alkyl group; and
 c) 20 to 70 wt % of a nonionic copolymerizable monomer other than a) and b) of formula $$CH_2=CYZ$$

wherein Y is H, $CH_3$ or chlorine; Z is COOR, $CONH_2$, CONHR, $CONR_2$, $C_6H_4R'$, CN, Cl, OCOR" or $CH=CH_2$; R is C1-C8 alkyl or C2-C8 hydroxyalkyl; R' is H, Cl, Br or C1-C4; and R" is C1-C8 alkyl,
in the presence of tert-dodecyl mercaptan as chain transfer agent in an amount of from 0.15 to 2 parts by weight per 100 parts by weight of monomers.

12. A process for preparing a paper coating slip additive according to claim 1, the process comprising free radically polymerizing a monomer mixture of
 a) an acid monomer selected from ethylenically unsaturated C3 to C8 carboxylic acids;
 b) an associative monomer of formula $$H_2C=CR^1-COO-(EO)_n-(PO)_m-R^2$$

wherein $R^1$ is hydrogen or methyl, n is at least two, m is from zero to 50, EO is an ethylene oxide group, PO is a propylene oxide group and $R^2$ is a C8-C30 alkyl group or a C8-C30 alkaryl group, and
 c) a nonionic copolymerizable monomer other than a) and b) in the presence of tert-dodecyl mercaptan as a chain transfer agent in an amount such that the additive has a weight average molecular weight of below 200,000.

13. A paper coating composition, comprising the paper coating slip additive according to claim 1, inorganic pigments, a binder and water.

14. The paper coating composition according to claim 13, wherein a solids content is greater than 65% and a pH is greater than 7.

15. The paper coating composition according to claim 13, comprising:
 (i) 0.05 to 2 parts by weight, based on 100 parts by weight of pigments, of the additive,
 (ii) 80 to 95 wt %, based on a total solids content, of at least one pigment selected from the group consisting of calcium sulfate, calcium aluminate sulfate, barium sulfate, magnesium carbonate, calcium carbonate, silicas, aluminas, aluminum hydrate, silicates, titanium dioxide, zinc oxide, kaolin, argillaceous earth, talc and silicon dioxide, and
 (iii) 1 to 25 parts by weight of a binder and optionally a thickener.

16. A paper or board coated with a paper coating composition according to claim 13.

17. The additive according to claim 1, wherein the additive has a weight average molecular weight of from 150,000 to 200,000.

18. The additive according to claim 1, wherein an amount of acid monomer a) is from 30 to 55 wt % based on a total weight of all monomers.

19. The additive according to claim 1, wherein an amount of associative monomer b) is from 0.5 to 5 wt % based on a total weight of all monomers.

20. The process according to claim 12, wherein the additive has a weight average molecular weight of from 150,000 to 200,000.

* * * * *